(12) United States Patent
Damron

(10) Patent No.: US 8,612,978 B2
(45) Date of Patent: Dec. 17, 2013

(54) CODE EXECUTION UTILIZING SINGLE OR MULTIPLE THREADS

(75) Inventor: Peter Carl Damron, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 440 days.

(21) Appl. No.: 12/634,855

(22) Filed: Dec. 10, 2009

(65) Prior Publication Data

US 2011/0145834 A1    Jun. 16, 2011

(51) Int. Cl.
*G06F 9/46* (2006.01)

(52) U.S. Cl.
USPC ........... 718/100; 718/104; 718/106; 718/107; 718/108

(58) Field of Classification Search
None
See application file for complete search history.

(56) References Cited

U.S. PATENT DOCUMENTS

| | | | |
|---|---|---|---|
| 2005/0198635 A1* | 9/2005 | Olszewski et al. | 718/100 |
| 2005/0251670 A1* | 11/2005 | Michaelis | 713/1 |
| 2006/0230409 A1* | 10/2006 | Frigo et al. | 718/108 |
| 2007/0130568 A1* | 6/2007 | Jung et al. | 718/104 |

* cited by examiner

*Primary Examiner* — Emerson Puente
*Assistant Examiner* — Dong Kim
(74) *Attorney, Agent, or Firm* — Polsinelli PC

(57) ABSTRACT

A program is executed utilizing a main hardware thread. During execution, an instruction specifies to execute a portion utilizing a worker hardware thread. If a processor state indicator is set to multi-threaded, the specified portion is executed utilizing the worker hardware thread. However, if the processor state indicator is set to single-threaded, the specified portion is executed utilizing the main hardware thread as a subroutine. The main hardware thread may pass parameter data to the worker hardware thread by copying the parameter data register or memory location for the main hardware thread to an equivalent parameter data register or memory location for the worker hardware thread. Similarly, the worker hardware thread may pass return values to the main hardware thread by copying a return value register or memory location for the worker hardware thread to an equivalent return value register or memory location for the main hardware thread.

18 Claims, 14 Drawing Sheets

```
Program (MAIN CODE)
    ...
    work 1
    ...
    set Register1 to K
    fork_call Y
    ...
    work 2
    ...
    join_call
    ...
    use Register2
    ...
    work 3
    ...

(SUBROUTINES)

Y:
    ...
    use Register1
    ...
    work 4
    ...
    compute Register2
    ret_fork

...
```

```
Thread 1 work 1 set Register1 to K fork_call Y

Y:

use Register1 work 4 compute Register2 ret_fork work 2 join_call (noop)

use Register2 work 3
```

CODE EXECUTION UTILIZING SINGLE OR MULTIPLE THREADS

FIELD OF THE INVENTION

This invention relates generally to computer program execution, and more specifically to code execution utilizing single or multiple threads.

BACKGROUND

Hardware "threads" are hardware resources of processors that are able to perform separate streams of execution simultaneously with and independent of other processing executing on a computing device. To increase the execution speed and efficiency of computer programs by a computing device, the computer program can be executed by more than one hardware thread and the computing device switches between the hardware threads. However, the increase in execution speed and efficiency of executing computer programs utilizing multiple hardware threads is offset against the synchronization overhead, i.e. the resources that must expended in communicating among the various hardware threads.

Conventional hardware threads have limited resources available for execution and thus typically are limited in the amount of computational work they can perform. This limitation can be mitigated to an extent by increasing the number of hardware threads utilized to execute a computer program. However, current implementations of hardware threads typically communicate and synchronize through memory operations, and thus have high communication and synchronization overheads. The larger the communication and synchronization overhead, the more work each hardware thread has to perform in order for execution of a computer program utilizing multiple threads to be worthwhile.

Typically, computer program code is written to execute using a single hardware thread or multiple hardware threads. Computer programs written to execute using only a single hardware thread are unable achieve increased execution speed and efficiency by executing using multiple hardware threads, even when the benefits outweigh the costs. Computer programs written to execute using multiple hardware threads achieve increased execution speed and efficiency by executing using multiple hardware threads when the benefits in increased execution speed and efficiency outweigh the costs of synchronization, but are sometimes unable to avoid the drawbacks of executing using multiple hardware threads when the benefits in increased execution speed do not outweigh the costs of synchronization and communication. Further, computer programs written to execute using multiple hardware threads are usually unable to avoid other drawbacks of executing using multiple threads, such as when a sufficient number of hardware threads are not available and execution is thus delayed in waiting for available threads.

SUMMARY

A computing device executes a program utilizing a main hardware thread. The computing device encounters an instruction in the program specifying to execute a portion of the program utilizing one or more worker hardware threads. In response to the instruction, the computing device evaluates a processor state indicator. If the processor state indicator is set to multi-threaded, the computing device executes the specified portion of the program utilizing the worker hardware thread. The processor state indicator may include information specifying which hardware thread is the main hardware thread and which thread is the worker hardware thread. However, if the processor state indicator is set to single-threaded, the computing device executes the specified portion of the program utilizing the main hardware thread as if the specified portion is a subroutine in the program.

The processor state indicator may be set in response to a request from an operating system executing on the computing device. Alternatively, the computing device may set the processor state indicator based on the availability of additional hardware threads. In some embodiments, the processor state indicator may be set to single-threaded because the computing device may not support multi-threaded execution of programs.

The main hardware thread may pass parameter data to the worker hardware thread utilizing the same mechanism that the computing device passes parameter data from a caller subroutine to a callee subroutine, except that the register or memory location that stores parameter data for the main hardware thread may be copied to an equivalent register or memory location for the worker hardware thread. Similarly, the worker hardware thread may pass return values to the main hardware thread utilizing the same mechanism that the computing device passes return values from a callee subroutine to a caller subroutine, except that the register or memory location that stores return values for the worker hardware thread may be copied to an equivalent register or memory location for the main hardware thread.

Thus, the program can be executed using either single or multiple hardware threads depending on available resources and synchronization overhead. It is not necessary to compile separate single hardware threaded and multiple hardware threaded versions of the programs. The same program can be executed by computing devices that support multi-threaded execution or by computing devices that do not support such execution.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The present disclosure may be better understood, and its numerous features made apparent to those skilled in the art by referencing the accompanying drawings.

DETAILED DESCRIPTION

The present disclosure describes systems and methods that execute code with a variable number of hardware threads. A first portion of the code is executed using a main hardware thread. The code includes instructions to execute a second portion of the code using a worker hardware thread. If a processor state indicator indicates that the processor is operating in multi-threaded mode, the second portion of the code is executed using the worker hardware thread. The main hardware thread and worker hardware thread pass data utilizing the same mechanism the processor utilizes to pass data to and from subroutines and the main hardware thread, except that parameter and return registers are copied from one thread to the other. The main and worker hardware threads are synchronized by setting and checking thread state indicators of the respective threads. However, if the processor state indicator indicates that the processor is operating in single-threaded mode, the second portion of the code is executed using the main hardware thread as if the second portion was a subroutine.

As the present disclosure enables the code to be executed using either single or multiple hardware threads depending on available resources and synchronization overhead, the code can be executed using multiple threads when multiple threads are available or using single threads when multiple threads are not available. Separate single hardware threaded and multiple hardware threaded versions of the code are unnecessary. The same code can be executed by processors that support the variable number of thread execution or by processors that do not support such execution by permanently setting the processor state indicator to indicate that the processor operates in single threading mode. This provides flexibility for processor designers. Further, compilers can evaluate code during compilation and automatically insert instructions to utilize the techniques of the present disclosure in various portions of the code. Because of the low synchronization overhead, such compilers will be more likely to find portions of the code where the techniques of the present disclosure can be utilized.

Figure 1:
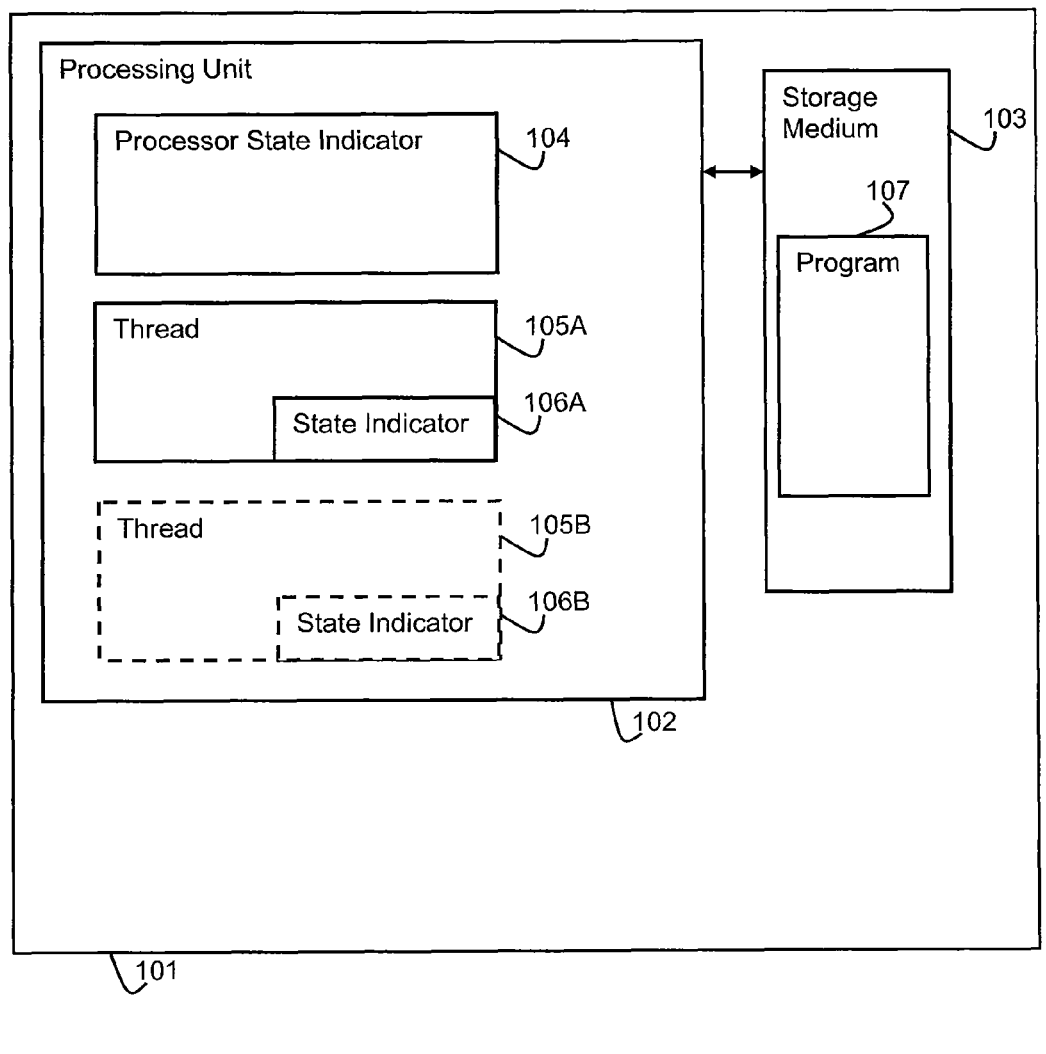
FIG. 1 is a block diagram illustrating a system 100 for executing code with a variable number of hardware threads, in accordance with an embodiment of the present disclosure.

FIG. 1 illustrates a system 100 for executing code with a variable number of hardware threads, in accordance with an embodiment of the present disclosure. The system 100 involves a computing device 101 that includes a processing unit 102 and a tangible machine-readable storage media 103. The processing unit 102 includes a processor state indicator 104 and a hardware thread 105A. In some implementations, the processing unit 102 may include one or more additional hardware threads 105B. However, in other implementations the processing unit 102 may be a single-threaded processing unit and may not include the one or more additional hardware threads 105B. The hardware thread 105A and the one or more hardware threads 105B include a thread state indicator 106A and 106B, respectively. The tangible machine-readable storage media 103 is operable to store one or more programs 107.

The processing unit 102 also includes one or more mechanisms (not shown) for passing data to and from subroutines. For example, when a subroutine is called during execution the program 107, data may be passed to the subroutine by a caller by storing parameter data in one or more subroutine call registers (not shown) and the called subroutine may read the parameter data from the subroutine call registers. When the called subroutine finishes execution, the subroutine may pass data back to the caller of the called subroutine by storing return value data in one or more subroutine return registers (not shown) and the caller of the called subroutine may read the return value data from the subroutine return registers. However, other implementations may store parameters and return values in a stack memory area rather than one or more registers.

The processing unit 102 executes at least a first portion of the program 107 using a first hardware thread 105A, referred to as the "main" hardware thread 105. The program includes instructions specifying execution of one or more other portions of the program using one or more additional hardware threads 105B, referred to as "worker" hardware threads 105. When the processing unit 102 executes the instructions specifying other portions of the program 107 to execute using worker hardware threads 105B, the processing unit 102 evaluates that processor state indicator 104. If the processor state indicator 104 is set to indicate that the processing unit 102 is operating in single-threaded mode, the processing unit 102 executes the other portions of the program 107, just as if the other portions of the program 107 were subroutines in the program 107, using the main hardware thread 105A.

However, if the processor state indicator 104 is set to indicate that the processing unit 102 is operating in multi-threaded mode, the processing unit 102 executes the other portions of the program 107 using one or more worker hardware threads 105B while executing the first portion of the program 107 using the main hardware thread 105A. In this case, the processor state indicator includes information identifying the hardware thread 105A is the main hardware thread 105A and the one or more hardware threads 105B that are the worker threads 105B. The processing unit 102 synchronizes execution by the main hardware thread 105A and the worker threads 105B utilizing the state indicators 106A and 106B of the respective hardware threads 105A and 105B and utilizing the mechanism for passing data to and from subroutines to pass data between the main hardware thread 105A and the worker threads 105B, which is enabled by copying register and/or memory values from one thread to the other.

By way of example of instructions specifying execution of one or more other portions of the program using one or more additional hardware threads 105B, the instruction set of the processing unit 102 may include a number of instructions for initiating, controlling, and/or synchronizing multi-threaded execution. These instructions may produce different execution results depending on the state indicated by the processor state indicator 104 and/or when executed by a main hardware thread 105A or a worker hardware thread 105B. In one implementation the instructions may include instruction such as a fork_call instruction, a wait_fork instruction, a join_call instruction, and a ret_fork instruction. In this implementation, the fork_call instruction constitutes the instruction specifying execution of code using a worker hardware thread 105B.

When a main hardware thread 105A executes a fork_call instruction and the processor state indicator 104 indicates that the processing unit 102 is operating in multi-threaded mode, the main hardware thread 105A suspends its own execution and sets its thread state indicator 106A to "waiting for fork". When the thread state indicator 106B of the identified worker hardware thread 105B indicates that the worker hardware thread 105B is in the "waiting for fork state", the main hardware thread 105A passes data to the worker hardware thread 105B utilizing the same mechanism the processing unit 102 utilizes to pass data to subroutines, except that register and/or memory data is copied from the main hardware thread 105A to the worker hardware thread 105B. Then the main hardware thread 105A instructs the worker hardware thread 105B identified in the processor state indicator 104 to start executing the code specified by the fork_call instruction, sets its thread state indicator 106A to "executing", and continues executing at the next instruction that follows the fork_call instruction. After the identified worker hardware thread 105B that was in the "waiting for fork state" has been instructed to start executing specified code by a main hardware thread 105A, the identified worker hardware thread 105B sets its thread state indicator 106B to "executing", obtains the data passed by the main hardware thread 105A, and begins executing the specified code.

However, when a main hardware thread 105A executes a fork_call instruction and the processor state indicator 104 indicates that the processing unit 102 is operating in single-threaded mode, the main hardware thread 105A branches to the code specified by the fork_call instruction just as if the fork_call instruction was a subroutine call and begins executing the specified code.

When a worker hardware thread 105B executes a fork_call instruction, the worker thread 105B may essentially become a master hardware thread 105B to its own worker hardware thread 105B and may execute the fork_call instruction as a master hardware thread 105B executes the join_call instruction. However, in some implementations, the worker hardware thread 105B may not be able to become a master hardware thread 105B to its own worker hardware thread 105B and execution by the worker hardware thread 105B of a fork_call instruction may trigger a trap.

When a worker hardware thread 105B executes a wait_fork instruction, the worker hardware thread 105B suspends its own execution and sets its thread state indicator 106B to "waiting for fork". If a main hardware thread 105A executes a wait_fork instruction, the main hardware thread 105A may trigger a trap as the wait_fork instruction does not perform any function for a main hardware thread 105A in this implementation.

When a main hardware thread 105A executes a join_call instruction after having executed a fork_call instruction, the main hardware thread 105A suspends its own execution and sets its thread state indicator 106A to "waiting for join" to wait for the worker thread 105B to finish executing to code that was specified. When the thread state indicator of the worker hardware thread 105B indicates that the worker hardware thread 105B is in the "waiting for join state", the main hardware thread 105A sets its thread state indicator 106A to "executing", obtains the data returned by the worker hardware thread 105B, and continues executing at the next instruction that follows the join_call instruction.

However, when a main hardware thread 105A executes a join_call instruction after not having previously executed a fork_call instruction, or if the main hardware thread 105A branched to the code specified by the executed fork_call instruction just as if the fork_call instruction was a subroutine call, the main hardware thread 105A executes the join_call instruction as if it were a no operation (noop) instruction.

When a worker hardware thread 105B executes a join_call instruction, the worker hardware thread 105B may trigger a trap as the join_call instruction does not perform any function for a worker hardware thread 105B in this implementation. However, in the case that the worker thread 105B has executed a fork_call instruction and has essentially become a master hardware thread 105B to its own worker hardware thread 105B, it may execute the join_call instruction as a master hardware thread 105B executes the join_call instruction.

When the worker hardware thread 105B executes a ret_fork instruction, the worker hardware thread 105B sets its thread state indicator 106B to "waiting for join" and suspends its own execution until the main hardware thread state indicator 106A is also set to "waiting for join". Then the worker hardware thread 105B returns data to the main hardware thread 105A utilizing the same mechanism that the processing unit 102 utilizes to return data from subroutines, except that some register and/or memory data will be copied from the worker hardware thread 105B to the main hardware thread 105A. If a main hardware thread 105A that branched to code specified by an executed fork_call instruction just as if the fork_call instruction was a subroutine call executes a wait_fork instruction, the main hardware thread 105A may branch and continue execution at the next instruction that followed the fork_call instruction.

In some implementations, the processing unit 102 is operable to set the processor state indicator 104. The processing unit 102 may set the processor state indicator 104 to indicate that the processing unit 102 is operating in multi-threaded mode when worker hardware threads 105B are available for multi-threaded execution of programs 107 and may set the processor state indicator 104 to indicate that the processing unit 102 is operating in single-threaded mode when worker hardware threads 105B are not available. The processing unit 102 may also set the processor state indicator 104 to indicate that the processing unit 102 is operating in single-threaded mode or multi-threaded mode in response to a request from an operating system that the processing unit 102 is executing. In other implementations, the processor state indicator 104 may be permanently set to indicate that the processing unit 102 is operating in single-threaded mode because the processing unit 102 does not support executing programs 107 using multiple threads.

The processing unit 102 may include one or more processing cores (not shown) and the first hardware thread 105A and the one or more additional hardware threads 105B may involve threads of the same processing core and/or different processing cores. Further, the system 100 may involve multiple processing units 102 and the first hardware thread 105A and the one or more additional hardware threads 105B may involve threads of the same processing unit 102 and/or different processing units 102. In some implementations, the main hardware thread 105A and the worker hardware thread 105B share a cache memory close to each and share the same core to minimize synchronization overhead.

The program 107 may have been compiled by a compiler designed to compile programs to execute code with a variable number of hardware threads in accordance with this disclosure. When the compiler compiles the programs, the compiler may evaluate the code of the programs to determine portions where the benefits in reduced execution time of execution using multiple threads exceeds the burden in increased execution time required to communicate between a main thread 105A and worker threads 105B. Upon identifying portions where the benefit exceeds the burdens, the compiler may insert instructions in the program 107 specifying execution of the portions using worker hardware threads 105B.

While the system 100 has been described as including computing device 101, a single processing unit 102, and a single storage medium 103, it will be understood that system 100 is illustrative and that multiple computing devices 101 (which may be communicably coupled), multiple processing units 102, and/or multiple storage media 103 may be utilized without departing from the scope of the present disclosure.

The tangible machine-readable storage medium 103 may include, but is not limited to, magnetic storage media (e.g., floppy diskette), optical storage media (e.g., CD-ROM); magneto-optical storage media, read only memory, random access memory, erasable programmable memory (e.g., EPROM and EEPROM), flash memory, and other types of memory and media suitable for storing electronic information. The computing device 101 may also include (not shown) one or more input and/or output devices (including, but not limited to displays, keyboards, mice, printers, scanners, and so forth), one or more buses (including, but not limited to, universal serial bus, small computer system interface, and so forth), and/or one or more communication components (including, but not limited to, modems, Ethernet adapters, wireless Ethernet adapters, and so forth).

Figure 2:
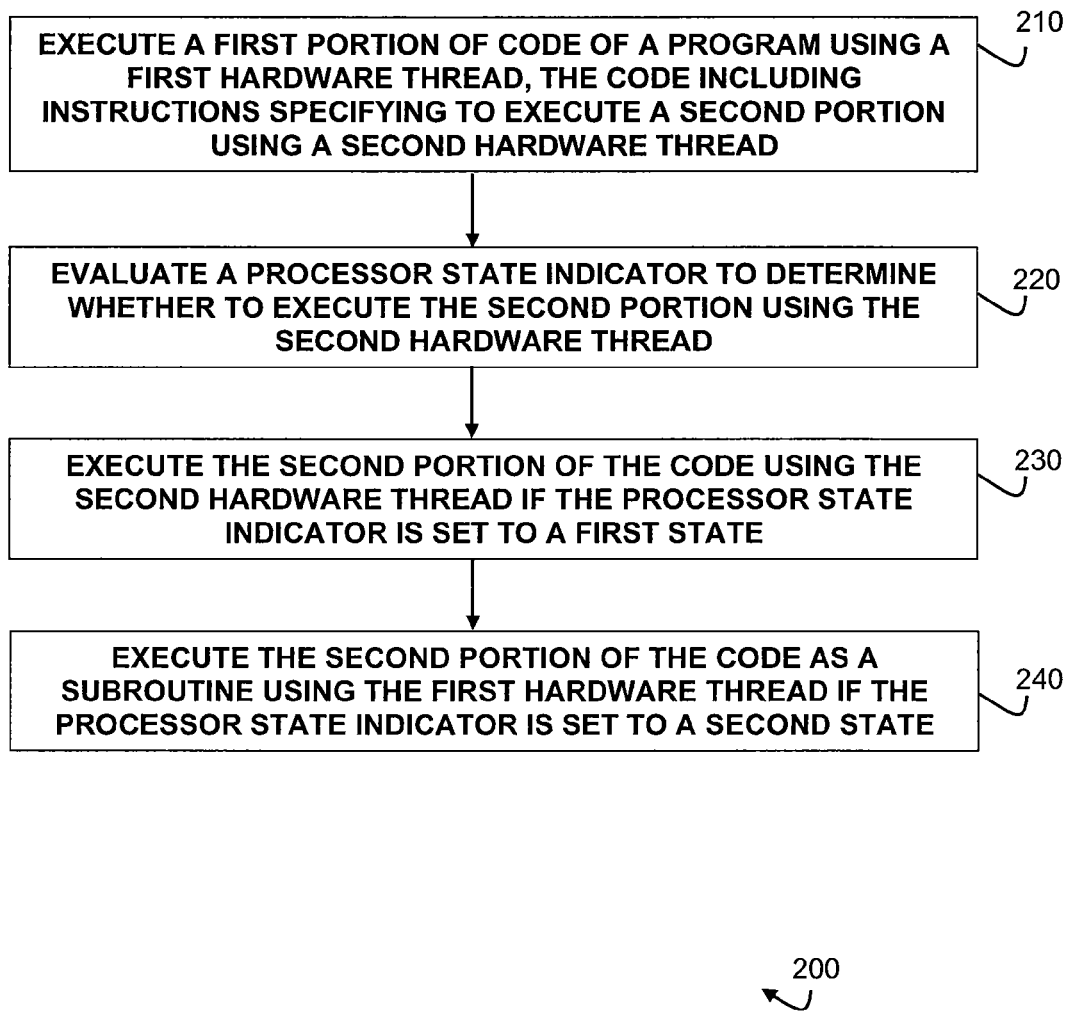
FIG. 2 is a method diagram illustrating a method for executing code with a variable number of hardware threads, which may be performed by the system of FIG. 1, in accordance with an embodiment of the present disclosure.

FIG. 2 illustrates a method 200 for executing code with a variable number of hardware threads, which may be performed by the system 100, in accordance with an embodiment of the present disclosure. The method 200 may comprise a computer-implemented method. The computer-implemented method may be performed by a processing unit, such as the processing unit 102, executing one or more sets of instructions included in a computer program product stored in the tangible machine-readable medium 103.

In a first operation 210, the processing unit 102 executes a first portion of the code of the program 107 using a first (main) hardware thread 105A. The code includes instructions specifying execution of a second portion of the code using a second (worker) hardware thread 105B.

In a second operation 220, the processing unit 102 evaluates the processor state indicator 104 to determine whether to execute the second portion of code using the second hardware thread 105B.

In a third operation 230, the processing unit 102 executes the second portion of the code using the second hardware thread 105B if the processor state indicator 104 is set to a first state. The first state may indicate that the processing unit 102 is operating in multi-threaded mode.

In a fourth operation 240, the processing unit 102 executes the second portion of the code as a subroutine using the first hardware thread 105A if the processor state indicator 104 is set to a second state. The second state may indicate that the processing unit 102 is operating in single-threaded mode.

Figure 3:
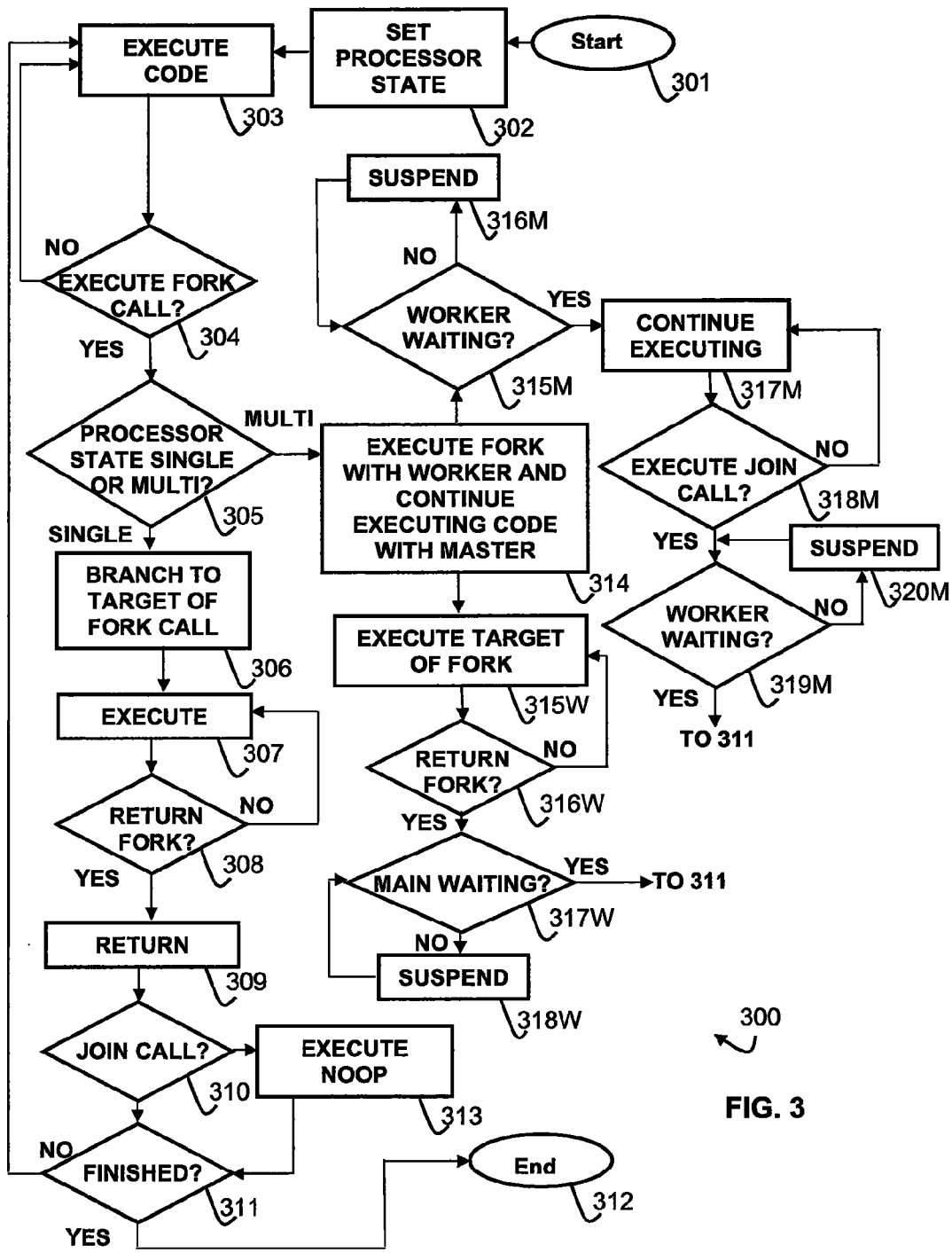
FIG. 3 is a flow chart illustrating an example flow of an implementation of the method of FIG. 2, in accordance with the present disclosure.

FIG. 3 illustrates the flow 300 of an example performance of method 200 by an example implementation of a computing device such as computing device 101. The flow starts at block 301 and proceeds to block 302. At block 302, the processing unit 102 sets the processor state indicator 104 and the flow proceeds to block 303. The processing unit 102 may set the processor state indicator 104 to indicate that the processing unit 102 is operating in single-threaded mode. The processing unit 102 may also set the processor state indicator 104 to indicate that the processing unit 102 is operating in multi-threaded mode. As part of setting the processor state indicator 104 to indicate that the processing unit 102 is operating in multi-threaded mode, the processing unit 102 sets the processor state indicator 104 to indicate the main hardware thread 105A and at least one worker hardware thread 105B and set the status indicator 106B for the at least one worker hardware thread 105B to the "waiting for fork" state. However, in some embodiments, the worker hardware thread 105B will execute a wait fork instruction to set its own status indicator 106B to the "waiting for fork" state. The processing unit 102 may set the processor state indicator 104 to indicate that the processing unit 102 is operating in single-threaded mode or multi-threaded mode depending on the availability of hardware threads or in response to request from an operating system executing on the computing device 101.

At block 303, the processing unit 102 begins executing code of the program 107 using the main hardware thread 105A and the flow proceeds to block 304. At block 304, the processing unit 102 determines whether it has executed a fork_call instruction. The fork_call instruction may have been included in the code to specify a portion of the code to execute utilizing at least one worker thread 105B. If the processing unit 102 has executed a fork_call instruction, the flow proceeds to block 305. If the processing unit 102 has not executed a fork_call instruction, the flow proceeds to block 303.

At block 305, the processing unit 102 evaluates the processor state indicator 104 to determine whether the processing unit 102 is operating in multi-threaded or single-threaded mode. If the processor state indicator 104 indicates that the processing unit 102 is operating in single-threaded mode, the flow proceeds to block 306. If the processor state indicator 104 indicates that the processing unit 102 is operating in multi-threaded mode, the flow proceeds to block 314.

At block 306, the processing unit 102 branches to the target of the fork_call just as if the fork_call was a subroutine and the flow proceeds to block 307. At block 307, the processing unit 102 executes the code that is the target of the fork_call using the main hardware thread 105A and the flow proceeds to block 308. At block 308, the processing unit 102 determines whether it has executed a ret_fork instruction. If the processing unit 102 has executed a ret_fork instruction, the flow proceeds to block 309. If the processing unit 102 has not executed a ret_fork instruction, the flow proceeds to block 307.

At block 309, the processing unit 102 returns and continues executing the next instruction in the code immediately following the fork_call that was executed, just as if returning from a subroutine, and the flow proceeds to block 310. At block 310, the processing unit 102 determines whether it executes a join_call instruction. If the processing unit 102 executes a ret_fork instruction, the flow proceeds to block 313. At block 313, the processing unit 102 executes a noop instruction and the flow proceeds to block 311. If the processing unit 102 does not execute a ret_fork instruction, the flow proceeds to block 311.

At block 311, the processing unit 102 determines whether it is finished executing the code of the program 107. If the processing unit 102 is finished executing the code of the program 107, the flow proceeds to block 312 and ends. If the processing unit 102 is not finished executing the code of the program 107, the flow proceeds to block 303.

At block 314, the flow splits for the processing unit 102 to execute the target of the fork_call using a worker hardware thread 105B (the flow of which proceeds to block 315W) and continues executing the next instruction in the code immediately following the fork_call that was executed using the main hardware thread 105A (the flow of which proceeds to block 315M).

At block 315M, the processing unit 102 determines whether the status indicator 106B of the worker hardware thread 105B indicates that the worker hardware thread 105B is in the "waiting for fork" state. If the worker hardware thread 105B is in the "waiting for fork" state, the flow proceeds to block 317M. If the worker hardware thread 105B is not in the "waiting for fork" state, the flow proceeds to block 316M. At block 316M, the processing unit 102 suspends execution of the main hardware thread 105B and the flow proceeds to block 315M.

At block 317M, the processing unit 102 continues executing the next instruction in the code immediately following the fork_call that was executed using the main hardware thread 105A and the flow proceeds to block 318M. At block 318M, the processing unit 102 determines whether it has executed a join_call instruction. The join_call instruction may have been included in the code to specify the end of the portion of the code for the main thread 105A to execute while the at least one worker thread 105B executes the other portion. If the processing unit 102 has executed a join_call instruction, the flow proceeds to block 319M. If the processing unit 102 has not executed a join_call instruction, the flow proceeds to block 317M.

At block 319M, the processing unit 102 determines whether the status indicator 106 of the worker hardware thread 105B indicates that the worker hardware thread 105B is in the "waiting for join" state. The worker hardware thread 105B may be in the "waiting for join" state if the worker hardware thread 105B executed a ret_fork instruction. If the worker hardware thread 105B is in the "waiting for join" state, the flow proceeds to block 311. If the worker hardware thread 105B is not in the "waiting for join" state, the flow proceeds to block 320M. At block 320M, the processing unit 102 suspends execution of the main hardware thread 105A and the flow proceeds to block 319M.

At block 315W, the processing unit 102 executes the target of the fork_call using a worker hardware thread 105B and the flow proceeds to block 316W. At block 316W, the processing unit 102 determines whether it has executed a ret_fork instruction. If the processing unit 102 has executed a ret_fork instruction, the flow proceeds to block 317W. If the processing unit 102 has not executed a ret_fork instruction, the flow proceeds to block 315W.

At block 317W, the processing unit 102 determines whether the status indicator 106A of the main hardware thread 105A indicates that the main hardware thread 105A is in the "waiting for join" state. If the main hardware thread 105A is in the "waiting for join" state, the worker hardware thread 105B returns result data to the main hardware thread 105A and then the flow proceeds to block 311. If the main hardware thread 105A is not in the "waiting for join" state, the flow proceeds to block 318W. At block 318W, the processing unit 102 suspends execution of the worker hardware thread 105B and the flow proceeds to block 317W.

Figure 4:
FIG. 4 is a diagram illustrating pseudo code of a program that has been compiled to execute code with a variable number of hardware threads, in accordance with an embodiment of the present disclosure.

FIG. 4 illustrates example pseudo code 400 of a program that has been compiled to execute code with a variable number of hardware threads in accordance with the present disclosure. As illustrated, the main portion of the code 400 includes a work 1 section of code, an instruction to set a parameter passing register to a parameter value "K" following the work 1 section of code, a fork_call instruction to Y following the instruction to set the parameter passing register, a work 2 section of code following the fork_call instruction to Y, a join_call instruction following the work 2 section of code, an instruction to use a return value stored in a return value register following the work 2 section of code, and a work 3 section of code following the instruction to use the return value. Also as illustrated, the other portion of the code 400 includes Y which includes an instruction to use the parameter value stored in the parameter passing register, a work 4 section of code following the instruction to use the parameter value, an instruction to compute a return value to store in the return value register following the work 4 section of code, and a ret_fork instruction following the instruction to compute the return value.

Figure 5A:
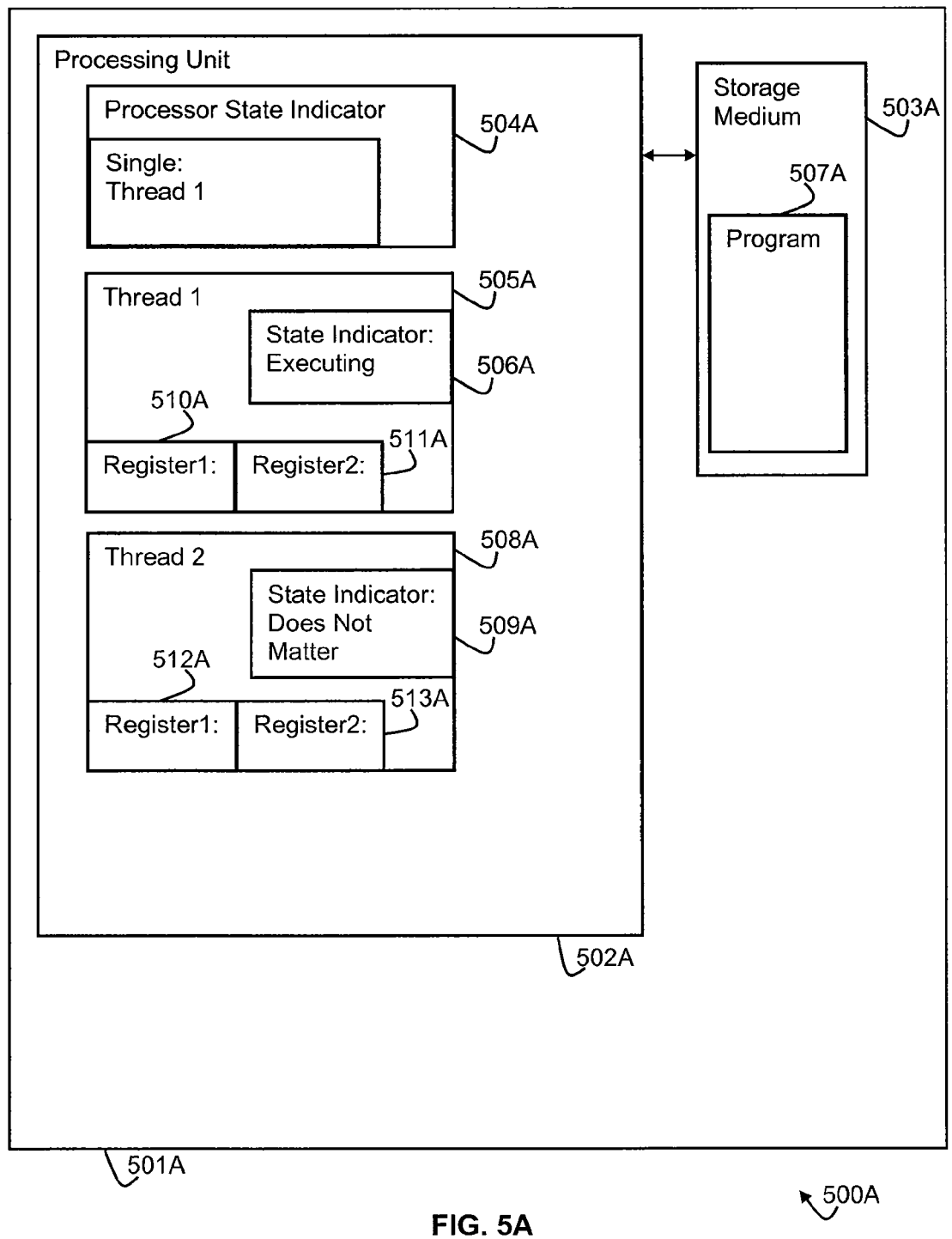
FIG. 5A is a block diagram illustrating a first sample system 500A executing the program of FIG. 4, in accordance with an embodiment of the present disclosure.
Figure 5B:
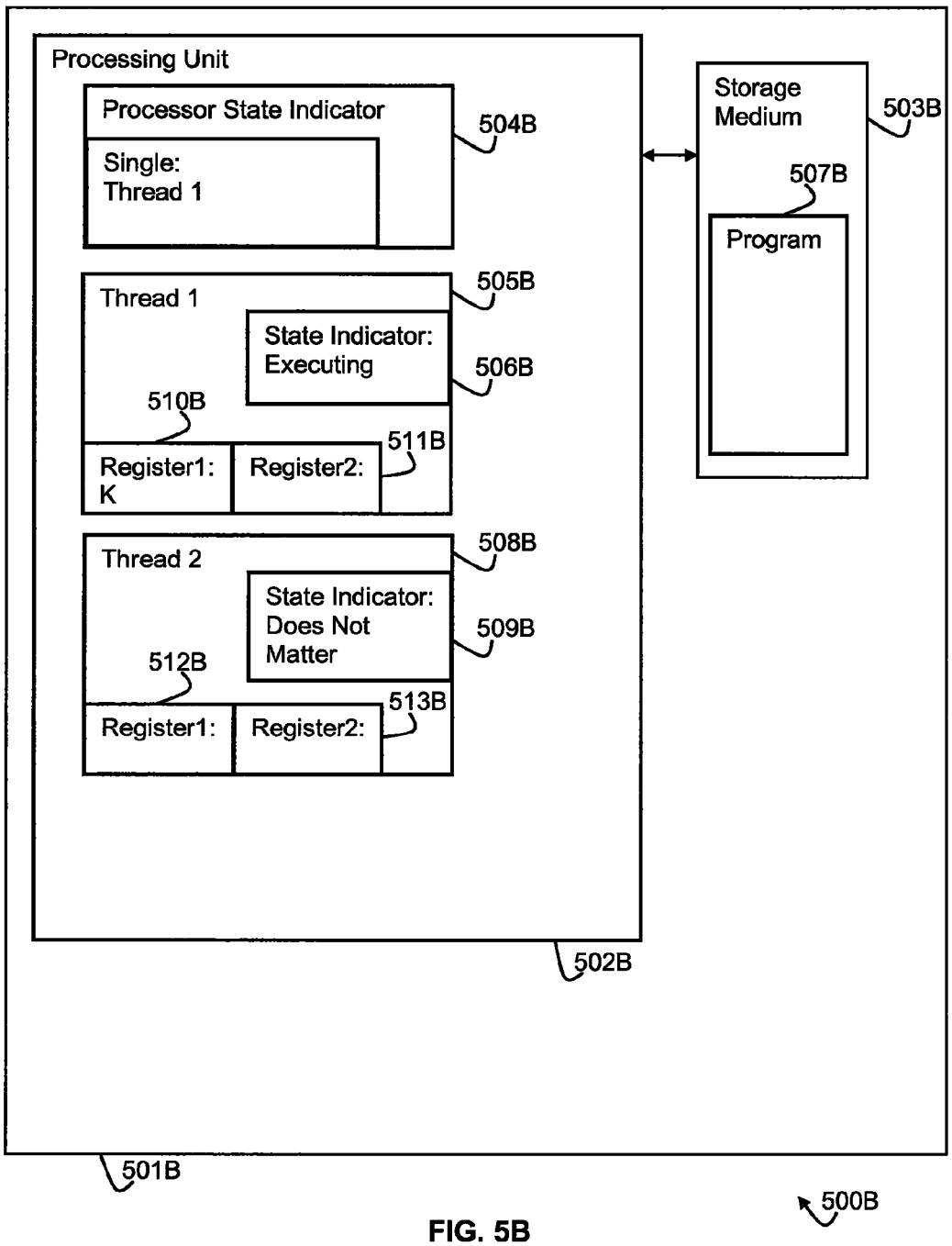
FIG. 5B is a block diagram illustrating the first sample system 500B executing the program of FIG. 4, in accordance with an embodiment of the present disclosure.
Figure 5C:
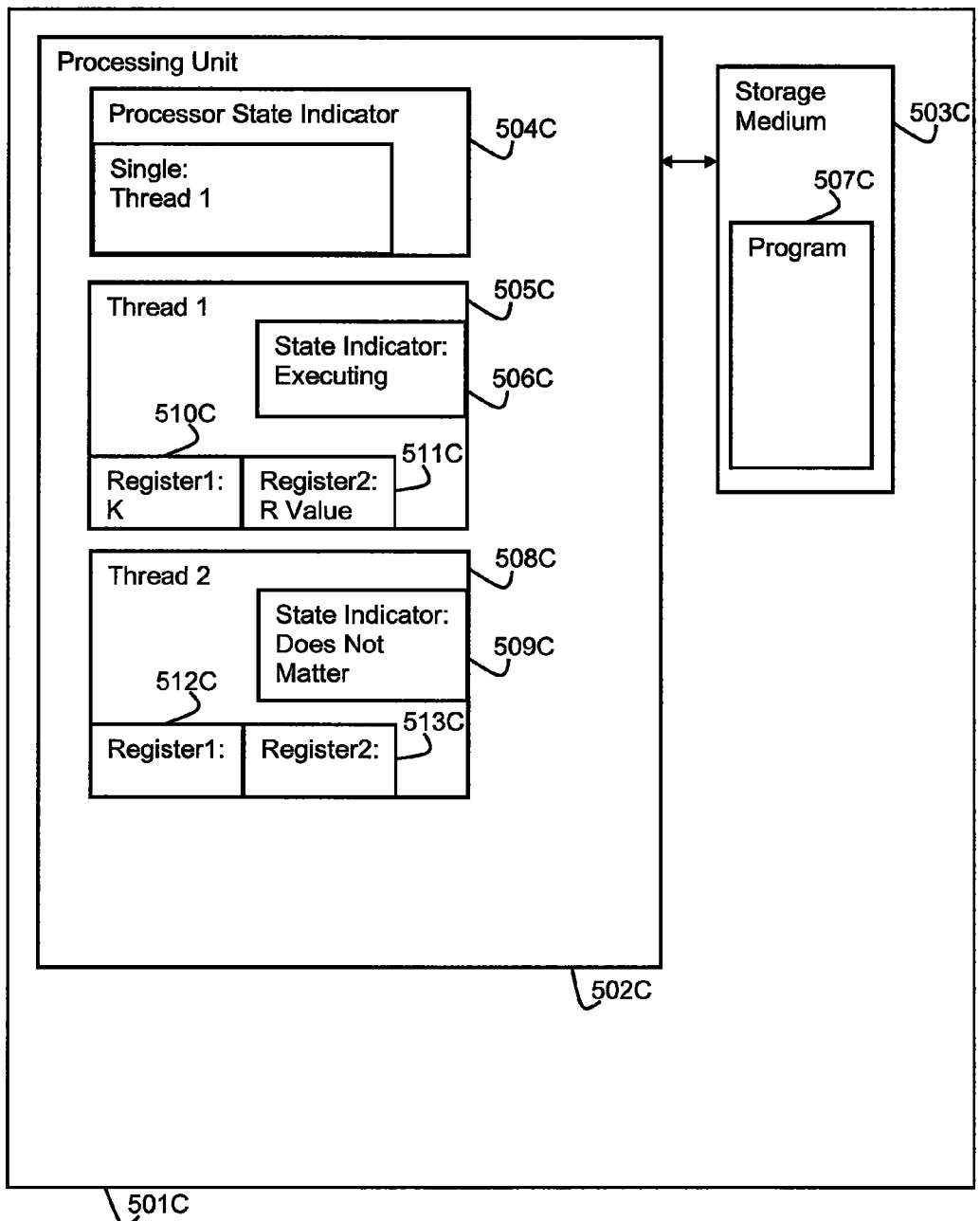
FIG. 5C is a block diagram illustrating the first sample system 500C executing the program of FIG. 4, in accordance with an embodiment of the present disclosure.

FIGS. 5A-5C are block diagrams illustrating a first sample system 500A-500C executing the code 400. It is understood that the numbering differences of the elements of the system 500A-500C illustrate state changes in the system 500A-500C and do not indicate different systems. The system 500A-500C involves a computing device 501A-501C that includes a processing unit 502A-502C and a tangible machine-readable storage media 503A-503C. The processing unit 502A-502C includes a processor state indicator 504A-504C, a Thread 1 hardware thread 505A-505C, and a Thread 2 hardware thread 508A-508C. The Thread 1 hardware thread 505A-505C includes a thread state indicator 506A-506C, a parameter passing register 510A-510C ("Register1"), and a return value register 511A-511C ("Register2"). The Thread 2 hardware thread 508A-508C includes a thread state indicator 509A-509C, a parameter passing register 512A-512C ("Register1"), and a return value register 513A-513C ("Register2"). The tangible machine-readable storage media 503A-503C stores a program 507A-507C, which is the code 400.

The registers Register1 510A-510C and Register2 511A-511C or Register1 512A-512C and Register2 513A-513C are utilized for passing data to and from subroutines. When a subroutine is called by the processing unit 502A-502C, data is passed to the subroutine by storing parameter data in Register1 510A-510C or Register1 512A-512C and the called subroutine reads the parameter data from Register1 510A-510C or Register1 512A-512C. When the called subroutine finishes execution, the subroutine passes data back to the caller of the called subroutine by storing return value data in Register2 511A-511C or Register2 513A-513C and the caller of the called subroutine reads the return value data from Register2 511A-511C or Register2 513A-513C.

As illustrated in FIG. 5A, the processor state indicator 504A indicates that the processing unit 502A is operating in a single-threaded mode and that the hardware thread to use for executing the program 507A is Thread 1 505A. Also as illustrated in FIG. 5A, the thread state indicator 506A of Thread 1 505A indicates that Thread 1 505A is in the "executing" state. The state of Thread 2 508A as indicated by the thread state indicator 509A does not matter in this example as it is irrelevant.

Figure 6:
FIG. 6 is a diagram illustrating the execution flow of the program of FIG. 4 as executed by the first sample system of FIGS. 5A-5C.

FIG. 6 illustrates the flow of execution 600 of the code 400 by the single hardware thread Thread 1 505A-505C. As illustrated, Thread 1 505A executes the work 1 section of code, records parameter data by setting Register1 510B to the value "K" (as illustrated in FIG. 5B), and then executes the fork_call to Y. As the processor state indicator 504B indicates that the processing unit 502B is operating in a single-threaded mode, Thread 1 505B branches to Y just as if Y was a subroutine.

Thread 1 505B and begins executing Y and reads the parameter data from Register1 510B. Then, Thread 1 505B executes the work 4 section of code, computes the return value to store in Register2 511C (as illustrated in FIG. 5C), and executes the ret_fork instruction. Because the fork_call to Y was executed as if Y was a subroutine, Thread 1 505C executes the ret_fork instruction as an instruction to return from the subroutine to the next instruction in the main code after the fork_call to Y.

Thread 1 505C branches back to the next instruction in the main code after the fork_call to Y and executes the work 2 section of code. Next, Thread 1 505C executes the join_call. Because the processing unit 502C is operating in single thread mode, Thread 1 505C executes the join_call as a noop. Finally, Thread 1 505C reads the return value from Register2 511C and executes the work 3 section of code.

FIGS. 7A-7E are block diagrams illustrating a second sample system 700A-700E executing the code 400. It is understood that the numbering differences of the elements of the system 700A-700E illustrate state changes in the system 700A-700E and do not indicate different systems. The system 700A-700E involves a computing device 701A-701E that includes a processing unit 702A-702E and a tangible machine-readable storage media 703A-703E. The processing unit 702A-702E includes a processor state indicator 704A-704E, a Thread 1 hardware thread 705A-705E, and a Thread 2 hardware thread 708A-708E. The Thread 1 hardware thread 705A-705E includes a thread state indicator 706A-706E, a parameter passing register 710A-710E ("Register1"), and a return value register 711A-711E ("Register2"). The Thread 2 hardware thread 708A-708E includes a thread state indicator 709A-709E, a parameter passing register 712A-712E ("Register1"), and a return value register 713A-713E ("Register2"). The tangible machine-readable storage media 703A-703E stores a program 707A-707E, which is the code 400.

The registers Register1 710A-710E and Register2 711A-711E or Register1 712A-712E and Register2 713A-713E are utilized for passing data to and from subroutines. When a subroutine is called by the processing unit 702A-702E, data is passed to the subroutine by storing parameter data in Register1 710A-710E or Register1 712A-712E and the called subroutine reads the parameter data from Register1 710A-710E or Register1 712A-712E. When the called subroutine finishes execution, the subroutine passes data back to the caller of the called subroutine by storing return value data in Register2 711A-711E or Register2 713A-713E and the caller of the called subroutine reads the return value data from Register2 711A-711E or Register2 713A-713E.

Figure 7A:
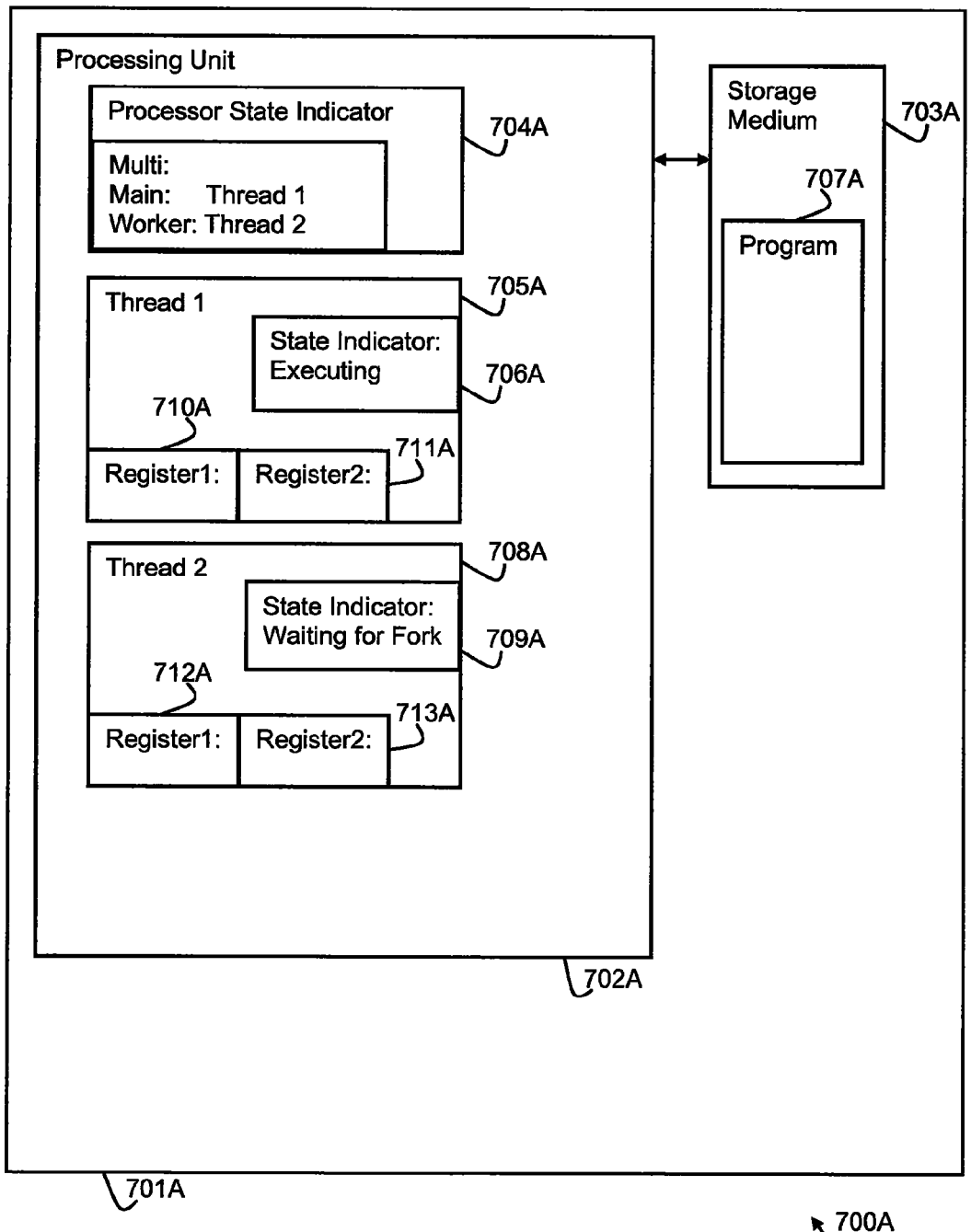
FIG. 7A is a block diagram illustrating a second sample system 700A executing the program of FIG. 4, in accordance with an embodiment of the present disclosure.

As illustrated in FIG. 7A, the processor state indicator 704A indicates that the processing unit 702A is operating in a multi-threaded mode, the main hardware thread to use for executing the program 707A is Thread 1 705A, and the worker main hardware thread to use for executing the program 707A is Thread 2 708A. Also as illustrated in FIG. 7A, the thread state indicator 706A of Thread 1 705A indicates that Thread 1 705A is in the "executing" state and the thread state indicator 709A of Thread 2 708A indicates that Thread 2 708A is in the "waiting for fork" state.

Figure 7B:
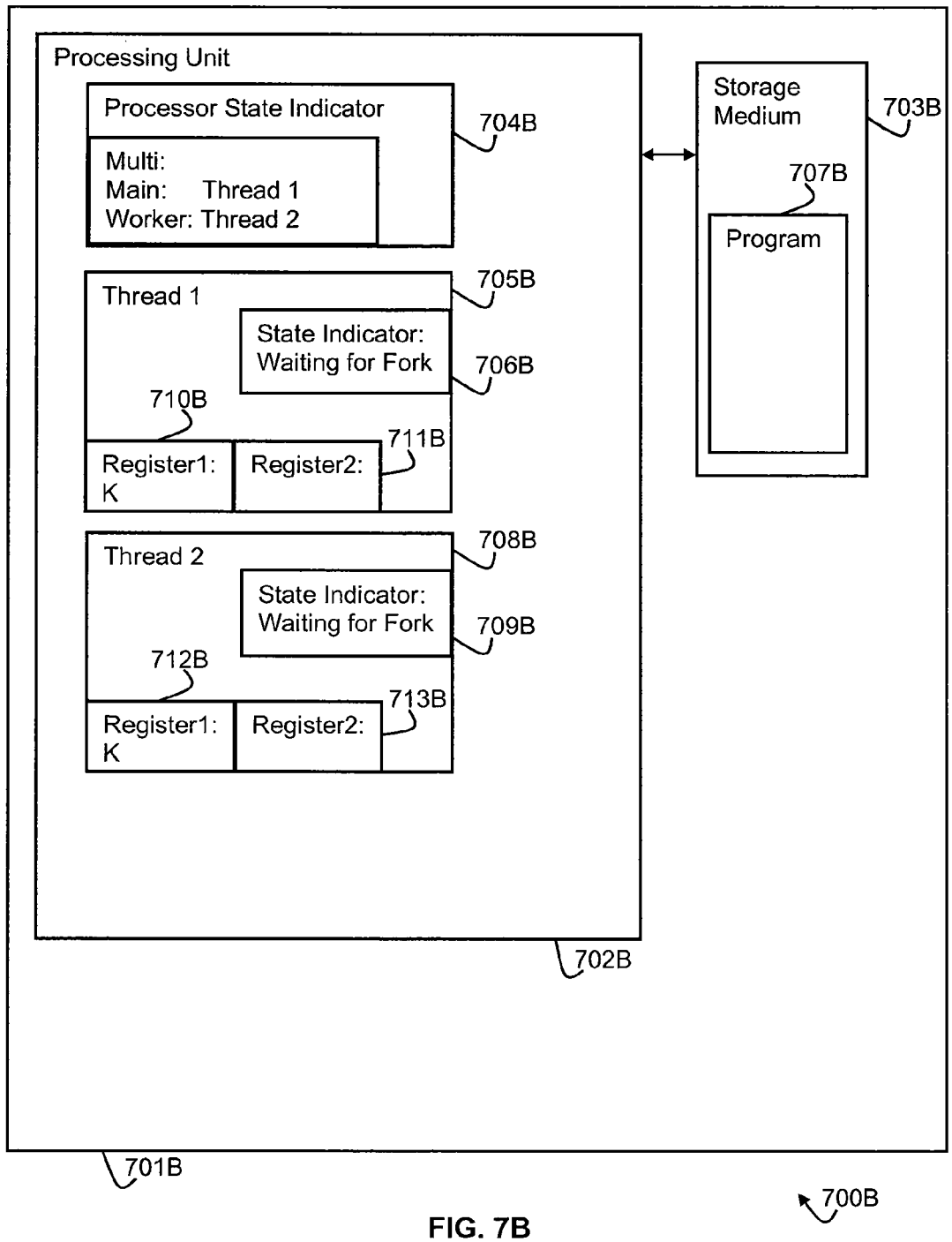
FIG. 7B is a block diagram illustrating the second sample system 700B executing the program of FIG. 4, in accordance with an embodiment of the present disclosure.
Figure 8:
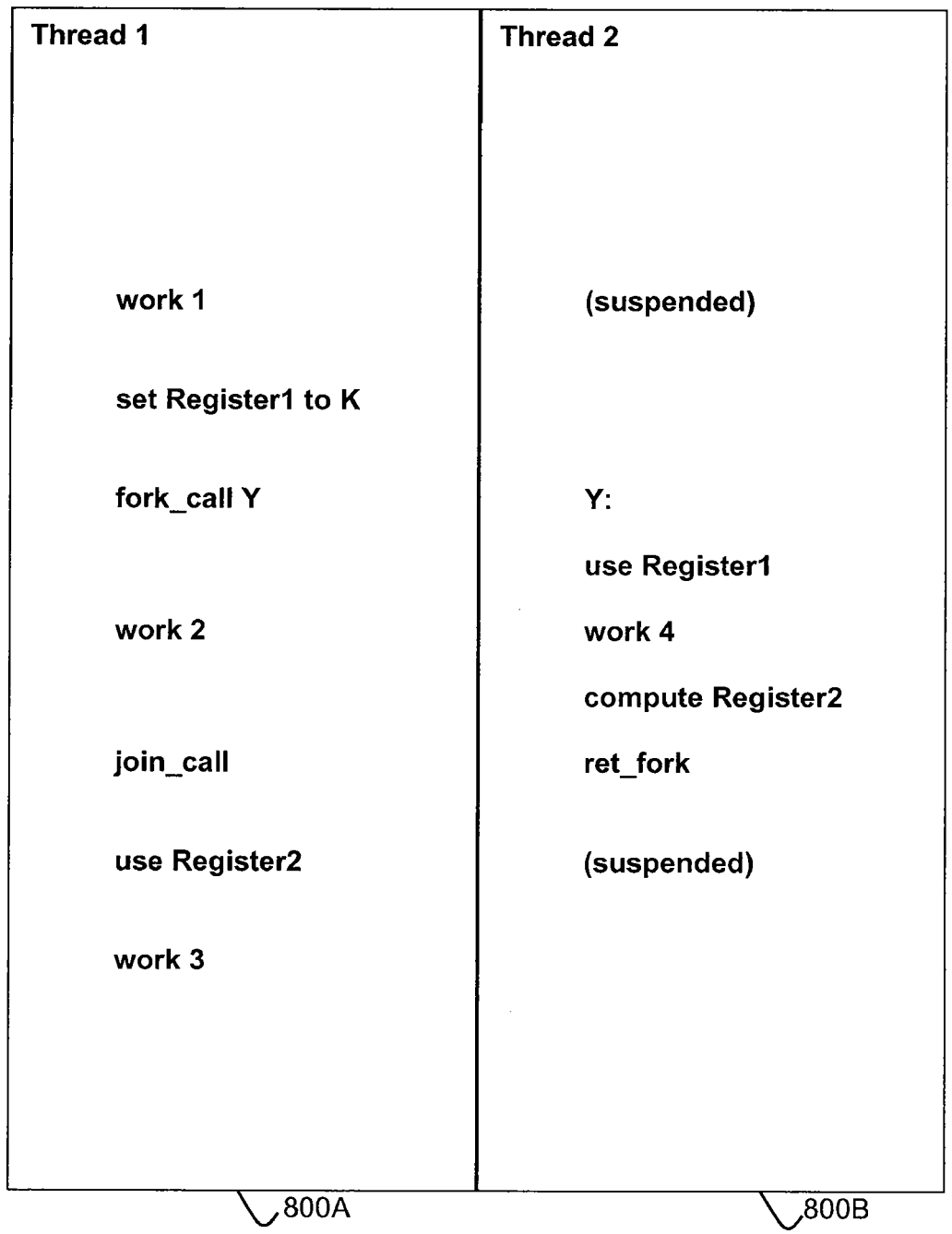
FIG. 8 is a diagram illustrating the execution flow of the program of FIG. 4 as executed by the second sample system of FIGS. 7A-7E.

FIG. 8 illustrates the flow of execution 800A and 800B of the code 400 by the multiple hardware threads Thread 1 705A-705E and Thread 2 708A-708E. As illustrated, Thread 1 705A executes the work 1 section of code, records parameter data by setting Register1 710B to the value "K" (as illustrated in FIG. 7B), and then executes the fork_call to Y. Also as illustrated, Thread 2 708B does not execute any code as the execution of Thread 2 708B is suspended. As the processor state indicator 704B indicates that the processing unit 702B is operating in a multi-threaded mode, Thread 1 705B suspends its execution, setting its thread state indicator 706B to the "waiting for fork" state. Since the thread state indicator 709B of Thread 2 708B is in the "waiting for fork" state, Thread 1 705B copies the parameter value stored in Register1 710B to Register1 712B and instructs Thread 2 708B to start executing Y.

Figure 7C:
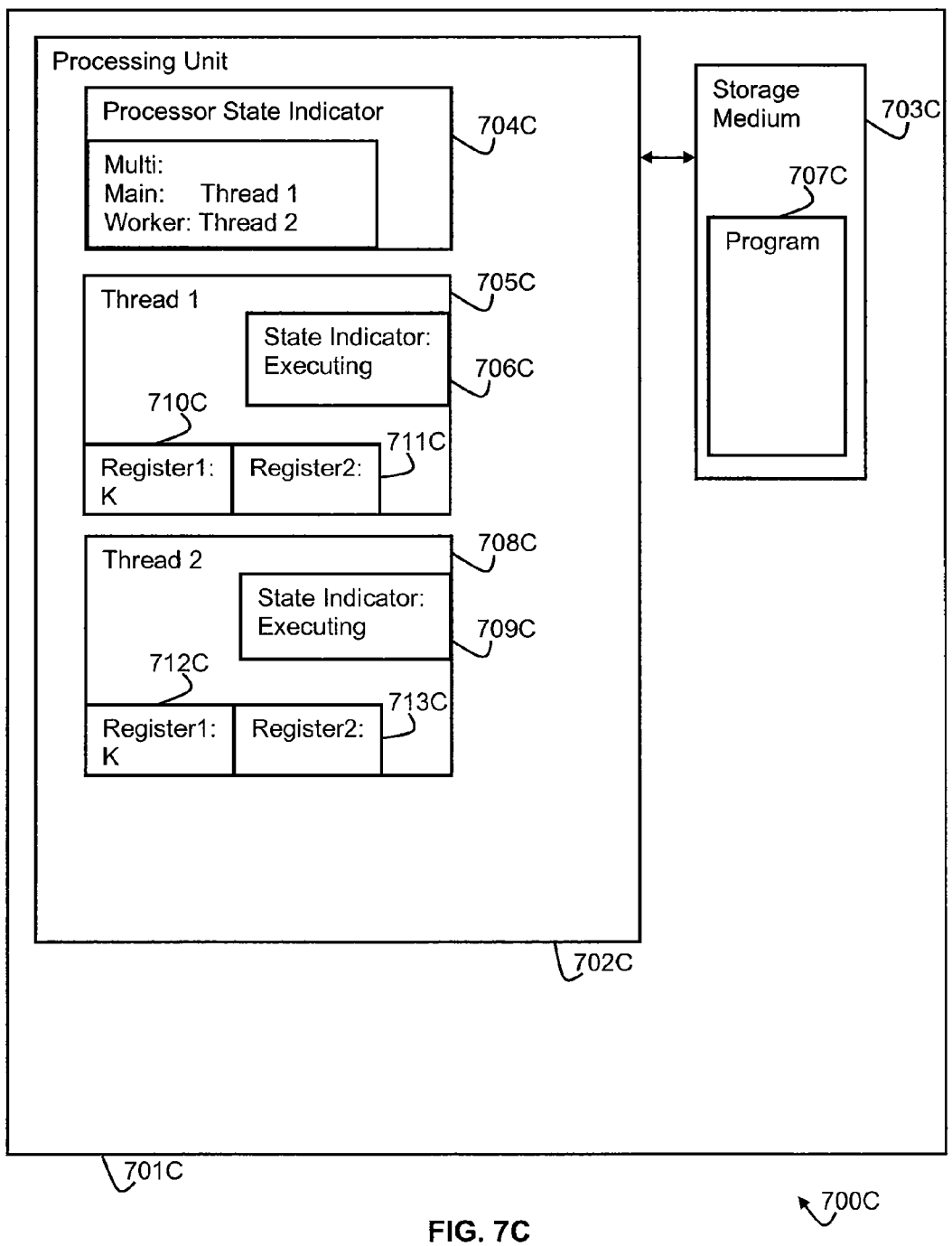
FIG. 7C is a block diagram illustrating the second sample system 700C executing the program of FIG. 4, in accordance with an embodiment of the present disclosure.

As illustrated in FIG. 7C, Thread 1 705C sets its thread state indicator 706C to the "executing" state and continues executing the next instruction after the fork_call to Y. Thread 2 708C sets the thread state indicator 709C to the "executing" state and begins executing Y. Then, in parallel, Thread 1 705C executes the work 2 section of code and Thread 2 708C reads the parameter data from Register1 712C, executes the work 4 section of code, and computes the return value to store in Register2 713D.

Figure 7D:
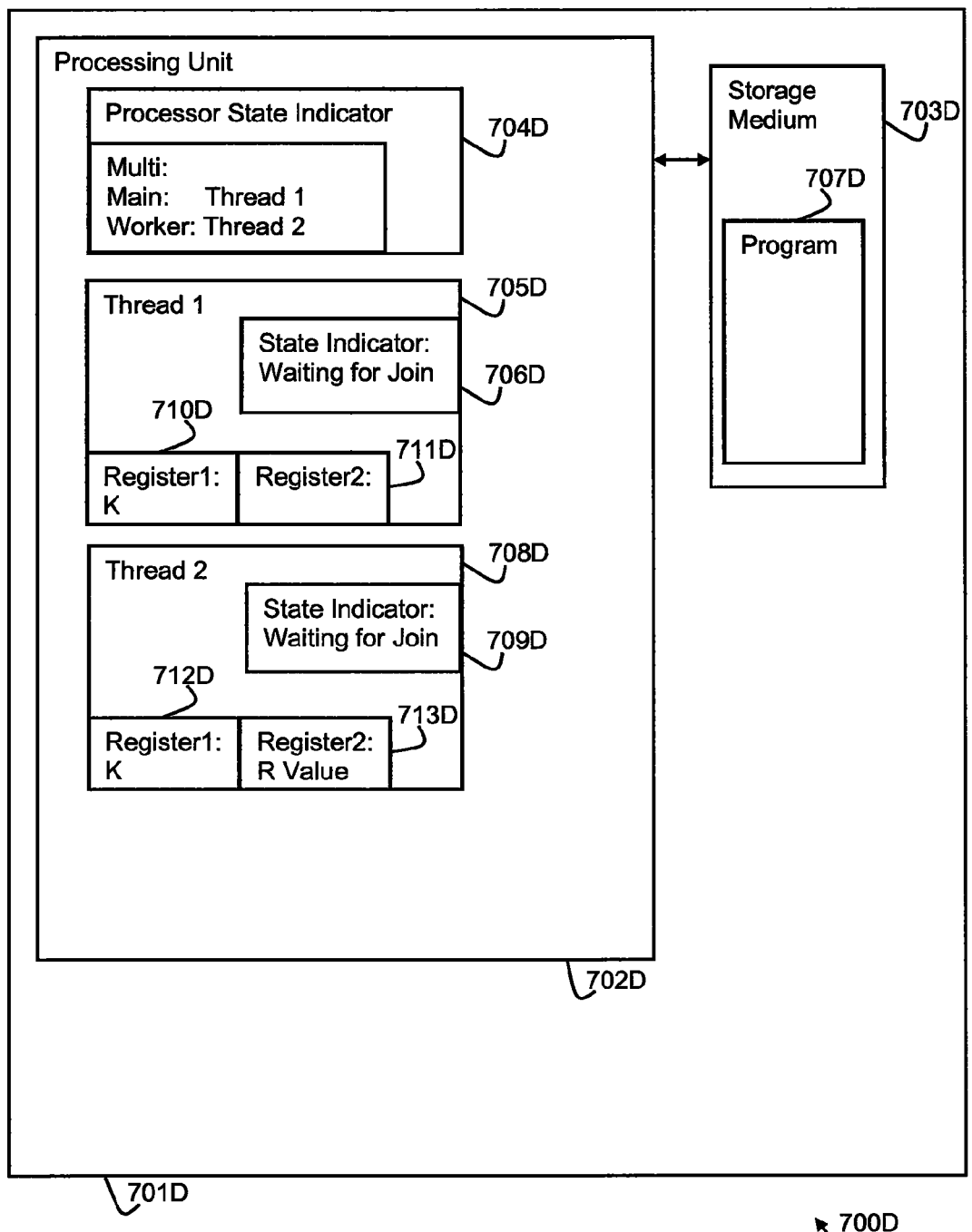
FIG. 7D is a block diagram illustrating the second sample system 700D executing the program of FIG. 4, in accordance with an embodiment of the present disclosure.
Figure 7E:
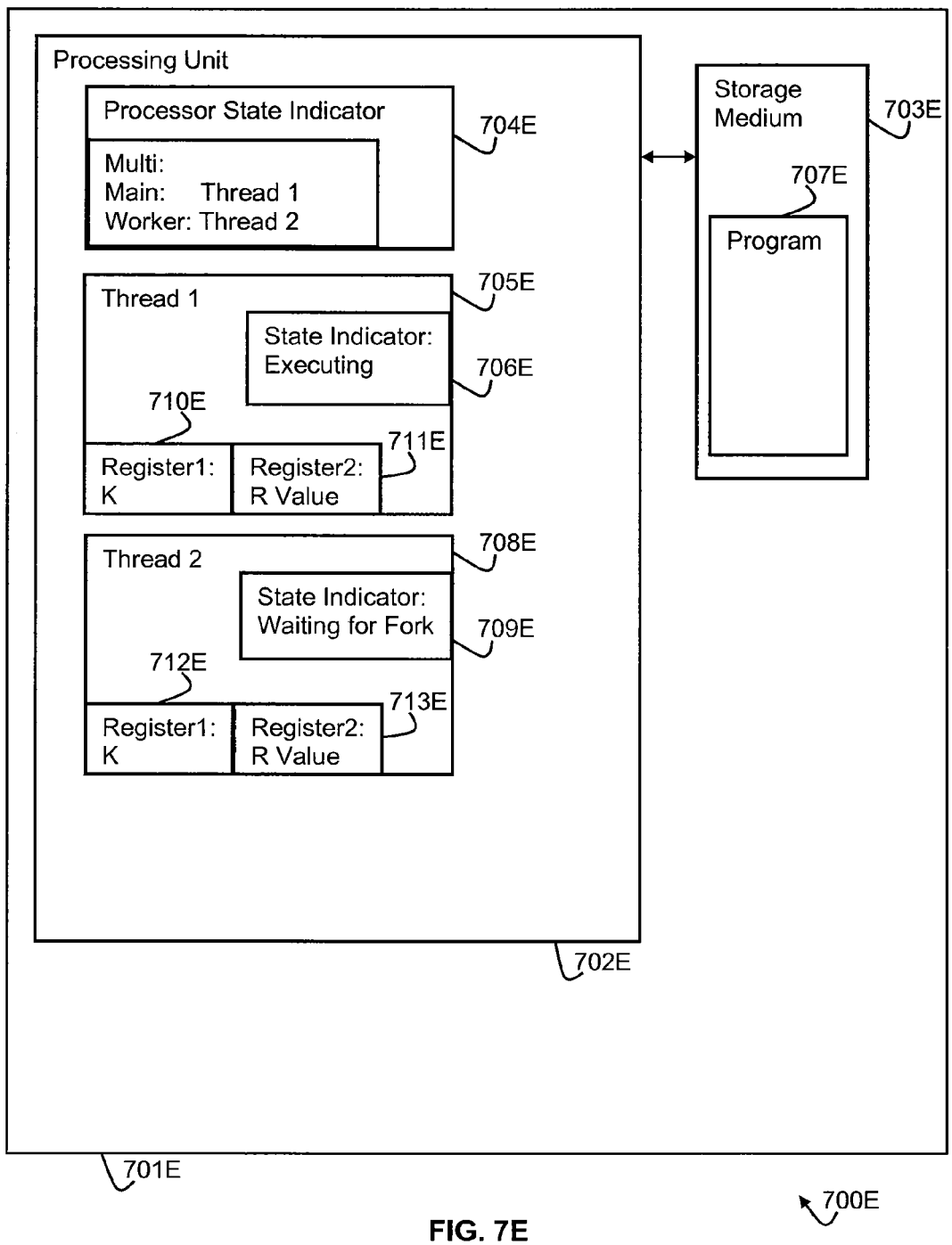
FIG. 7E is a block diagram illustrating the second sample system 700E executing the program of FIG. 4, in accordance with an embodiment of the present disclosure.

Next, in parallel, Thread 1 705D executes the join_call instruction and Thread 2 708C executes the ret_fork instruction. As illustrated in FIG. 7D, Thread 1 705D sets its thread state indicator 706D to the "waiting for join" state and Thread 2 708D sets its thread state indicator 709D to the "waiting for join" state and copies the return value stored in Register2 713D to Register2 711E (illustrated in FIG. 7E).

Because the thread state indicator 709E of Thread 2 708E is in the "waiting for join" state, Thread 1 705E reads the return value from Register2 711E and sets its thread state indicator 706E to the "executing" state. Also as illustrated, Thread 2 708E sets its thread state indicator 709E to the "waiting for fork" state and suspends its execution. Finally, referring again to FIG. 8, Thread 1 705E continues execution, reads the return value from Register2 711E, and executes the work 3 section of code. Thread 2 708E does not execute any code as the execution of Thread 2 708E is suspended.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readably by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for executing code with a variable number of hardware threads, comprising:
   executing, utilizing at least one processing unit, at least a first portion of code of a program using at least one hardware thread, the code stored in at least one tangible machine readable media, the code including at least one instruction that specifies execution of at least one additional portion of the code using at least one additional hardware thread;
   setting a processor state indicator indicating the operational mode of the at least one processing unit to a first state when at least one additional hardware thread is available; evaluating the processor state indicator to determine whether to execute the at least one additional portion of the code using the at least one additional hardware thread;
   if the processor state indicator is set to the first state, executing, utilizing the at least one processing unit, the at least one additional portion of the code using the at least one additional hardware thread;
   if the processor state indicator is set to a second state, executing, utilizing the at least one processing unit, the at least one additional portion of the code, as a subroutine using the at least one hardware thread and
   setting the processor state indicator to one of the first state or the second state, based on a request from the at least one processing unit for which the code is executed, by:
      setting the processor state indicator to the second state when the at least one processing unit does not support executing the at least one additional portion of the code using the at least one additional hardware thread.

2. The method of claim 1, wherein said setting the processor state indicator to the first state when the at least one additional hardware thread is available comprises:
   including at least one identifier for the at least one hardware thread and at least one identifier for the at least one additional hardware thread in the processor state indicator.

3. The method of claim 1, wherein said setting the processor state indicator to one of the first state or the second state based on a request from at least one of the at least one processing unit or an operating system for which the code is executed comprises:
   setting the processor state indicator to the second state when the at least one additional hardware thread is not available.

4. The method of claim 1, further comprising:
   evaluating the code during compilation to determine whether to enable multiple thread execution for the code; and
   inserting the at least one instruction that specifies execution of the at least one additional portion of the code using the at least one additional hardware thread based on the evaluation.

5. The method of claim 1, wherein said executing the at least one additional portion of the code, utilizing the at least one processing unit, using the at least one additional hardware thread comprises:
   executing the at least one instruction using the at least one hardware thread;
   if a thread state indicator of the at least one additional hardware thread is set to a first state, suspending the at least one hardware thread until the thread state indicator of the at least one additional hardware thread is set to a second state;
   requesting the at least one additional hardware thread execute the at least one additional portion of the code.

6. The method of claim 5, wherein said requesting the at least one additional hardware thread execute the at least one additional portion of the code comprises:
   passing data from the at least one hardware thread to the at least one additional hardware thread by copying at least one parameter passing register of the at least one hardware thread to at least one equivalent parameter passing register of the at least one additional hardware thread.

7. The method of claim 5, further comprising:
   executing at least one additional instruction using the at least one hardware thread, the at least one additional instruction instructs the at least one hardware thread to wait for the at least one additional hardware thread to finish executing;
   if the thread state indicator of the at least one additional hardware thread is set to the second state, suspending the at least one hardware thread until the thread state indicator of the at least one additional hardware thread is set to the first state.

8. The method of claim 7, further comprising:
   returning data to the at least one hardware thread from the at least one additional hardware thread by copying at least one return value register of the at least one additional processing thread to at least one equivalent return value register of the at least one hardware thread.

9. The method of claim 5, further comprising:
   executing at least one additional instruction in the at least one additional portion of the code using the at least one additional hardware thread, the at least one additional instruction instructs the at least one additional hardware thread to stop executing;
   setting the thread state indicator of the at least one additional hardware thread to the second state;
   suspending the at least one additional hardware thread.

10. The method of claim 1, wherein said executing the at least one additional portion of the code, utilizing the at least one processing unit, as a subroutine using the at least one hardware thread comprises:
   executing the at least one instruction using the at least one hardware thread; executing the at least one additional portion of the code using the at least one hardware thread.

11. The method of claim 10, further comprising:
   executing at least one additional instruction using the at least one hardware thread, the at least one additional instruction instructs the at least one hardware thread to wait for the at least one additional hardware thread to finish executing;
performing a no operation instruction instead of waiting for the at least one additional hardware thread to finish executing.

12. The method of claim 10, further comprising:
executing at least one additional instruction in the at least one additional portion of the code using the at least one hardware thread, the at least one additional instruction instructs the at least one additional hardware thread to stop executing;
executing a next instruction after the at least one instruction using the at least one hardware thread.

13. The method of claim 1, wherein the first state indicates that the processing unit executes in a single-threaded mode and the second state indicates that the processing unit executes in a multi-threaded mode.

14. A system for executing code with a variable number of hardware threads, comprising:
at least one tangible storage media, operable to store code of a program;
at least one processing unit, communicably coupled to the at least one tangible storage media, operable to execute at least a first portion of the code using at least one hardware thread, the at least one processing unit including a processor state indicator indicating the operational mode of the at least one processing unit, the processor state indicator operable to be set to a first state and a second state, the processor state indicator being set to the first state when at least one additional hardware thread is available;
wherein the code includes at least one instruction that specifies execution of at least one additional portion of the code using at least one additional hardware thread and wherein the at least one processing unit executes the at least one additional portion of the code using the at least one additional hardware thread when the processor state indicator is set to the first state and the at least one processing unit executes the at least one additional portion of the code using the at least one hardware thread when the processor state indicator is set to the second state and
wherein the code includes at least one other instruction that sets the processor state indicator to one of the first state or the second state, based on a request from the at least one processing unit for which the code is executed, by:
setting the processor state indicator to the second state when the at least one processing unit does not support executing the at least one additional portion of the code using the at least one additional hardware thread.

15. The system of claim 14, wherein the at least one processing unit includes at least one core and the at least one hardware thread and the at least one additional hardware thread are processor threads of the at least one core.

16. The system of claim 14, wherein the at least one processing unit includes a first core and a second core, the at least one hardware thread is a hardware thread of the first core, and the at least one additional hardware thread is a hardware thread of the second core.

17. The system of claim 14, wherein the at least one processing unit comprises a first processing unit and a second processing unit, the at least one hardware thread is a hardware thread of the first processing unit, and the at least one additional hardware thread is a processor thread of the second processing unit.

18. A non-transitory computer program product, comprising:
a first set of instructions, stored in at least one computer readable storage medium, executable by at least one processing unit to execute at least a first portion of code of a program using at least one hardware thread, the code including at least one instruction that specifies execution of at least one additional portion of the code using at least one additional hardware thread;
a second set of instructions, stored in the at least one computer readable storage medium, executable by the at least one processing unit to set a processor state indicator indicating the operational mode of the at least one processing unit to a first state when at least one additional hardware thread is available;
a third set of instructions, stored in the at least one computer readable storage medium, executable by the at least one processing unit to evaluate a the processor state indicator to determine whether to execute the at least one additional portion of the code using the at least one additional hardware thread;
a fourth set of instructions, stored in the at least one computer readable storage medium, executable by the at least one processing unit to execute the at least one additional portion of the code using the at least one additional hardware thread when the processor state indicator is set to the first state;
a fifth set of instructions, stored in the at least one computer readable storage medium, executable by the at least one processing unit to execute the at least one additional portion of the code as a subroutine using the at least one hardware thread when the processor state indicator is set to a second state and
a sixth set of instructions, stored in the at least one computer readable storage medium and executable by the at least one processing unit to set the processor state indicator to one of the first state or the second state, based on a request from the at least one processing unit for which the code is executed, by:
setting the processor state indicator to the second state when the at least one processing unit does not support executing the at least one additional portion of the code using the at least one additional hardware thread.

* * * * *